CHANNEL SELECTOR

Filed Sept. 27, 1952

INVENTOR
MAURICE A. MEYER

BY Joseph Weingarten
ATTORNEY

United States Patent Office 2,974,286

Patented Mar. 7, 1961

2,974,286

CHANNEL SELECTOR

Maurice A. Meyer, Natick, Mass., assignor to Laboratory for Electronics, Inc., Boston, Mass., a corporation of Delaware Filed Sept. 27, 1952, Ser. No. 311,885

6 Claims. (Cl. 328—116)

The present invention relates in general to apparatus for processing electrical data and more specifically to an electronic system capable of selecting a signal for further transmission and interpretation from one of a plurality of signal channels on the basis of some predetermined signal characteristic such as amplitude. In the following discussion, this novel circuit will be referred to broadly as a channel selector.

The need for a channel selector is frequently encountered in electrical signaling systems.

Considering any system offering more than one input signal channel, it is a primary object of this invention to provide apparatus for selecting that channel having the largest signal return and for directing to a utilization circuit the output of the chosen channel. The precise nature of the utilization circuit is wholly beyond the scope of the present discussion, and has been mentioned functionally solely to provide some indication of the utility of the channel selector itself.

In application of this invention each of the input channels is connected to a corresponding channel selector unit and the output circuits of all such units coupled to the utilization circuit. All channel selector unit circuits are alike, and all selectors are intercoupled to provide in each a reference point for the comparison signals applied to all.

It is, therefore, a further object in this invention to provide a plurality of similar and mutually coupled circuits arranged whereby an output signal is derived from one upon the simultaneous application to one or more electrical signals of varying amplitudes.

It is another object of this invention to provide an individual selector unit which may be intercoupled with any number of like circuits and arranged whereby, upon the application to all of variable amplitude periodic signals, a periodic output is obtained from but one such selector.

Figure 1:
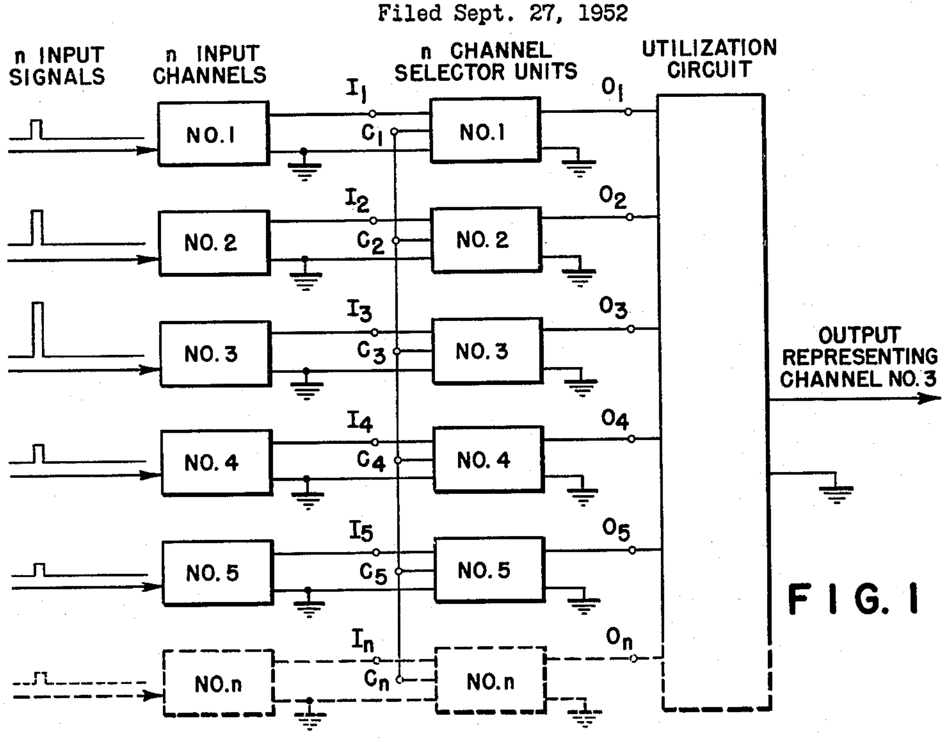
Figure 2:
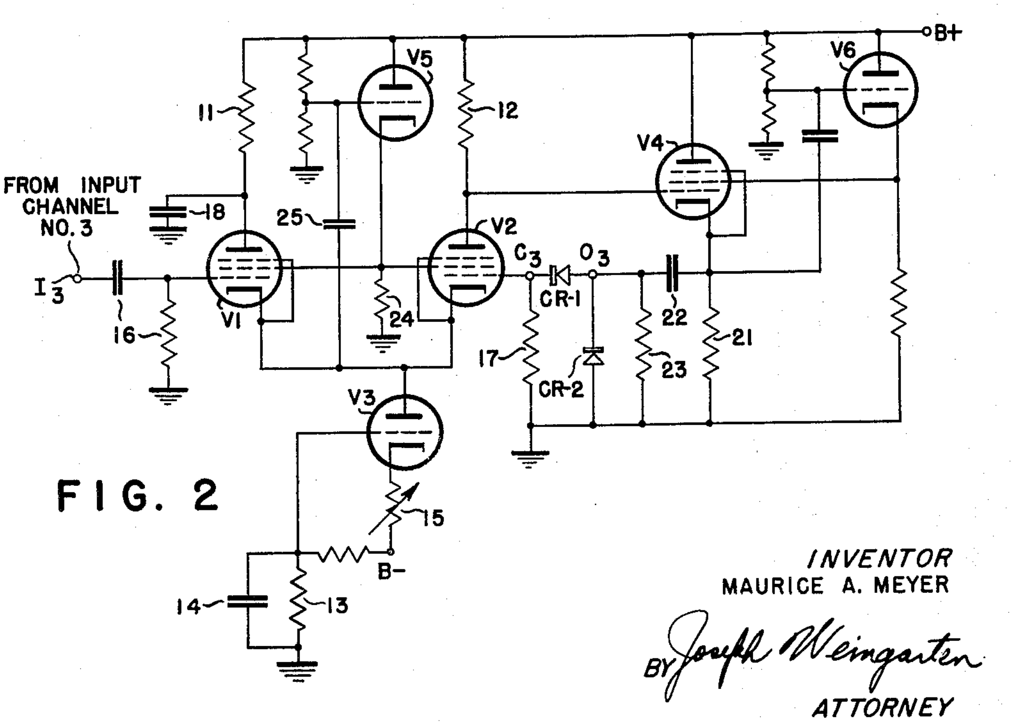

These and other objects of the present invention will now become apparent from the following detailed specification taken in connection with the accompanying drawing in which:

Fig. 1 is a generalized and functional block diagram illustrating the use of a number of channel selector units between appropriate input circuits and an output utilization circuit; and Fig. 2 is a schematic circuit diagram representative of a preferred embodiment of each of the channel selector units employed in the system of Fig. 1.

With reference now to the drawing, and more particularly to Fig. 1 thereof, there is illustrated in block form the organization of a system incorporating the channel selection principles of the present invention. The system is comprised of *n* parallel input signal channels designated as No. 1–No. *n*, which may be amplifiers, for example, deriving their input signals from a multi-channel signal source. As will become apparent, it is quite essential that the gain be the same for all channels. In a practical instance, all input channels are amplifiers of adjustable gain, each of which is arranged so that its overall gain from the original signal source to the amplifier output is equalized with that of all other channels.

Each of the *n* input channels has an output line directly coupled to the input of a correspondingly designated one of *n* channel selector circuit units. As illustrated, the output of all selector units are thereafter directed to the input of apparatus broadly referenced as a utilization circuit, which serves to provide the system output signal.

The input and output terminals of each selector unit have been designated by the letters I and O respectively, with a subscript denoting the channel number. In addition to input and output terminals each selector unit includes a common terminal C, with a subscript likewise indicative of channel number, and the overall channel selector system requires that all common terminals $C_1$–$C_n$ be connected electrically in parallel, as shown in Fig. 1.

Generalizing at this point, the circuit arrangement of Fig. 1 has the property of continuously selecting the signal channel carrying the largest signal amplitude, and transferring to the utilization circuit the signal carried by the chosen channel.

The *n* channel selector units illustrated in Fig. 1 are identical in circuit configuration, and, consequently, it will only be necessary to describe the details of one. With reference now to Fig. 2, there is disclosed a schematic circuit diagram of the channel selector unit designated as No. 3 in Fig. 1. The input, output and common terminals of the unit are labelled $I_3$, $O_3$ and $C_3$ respectively in Fig. 2 to correspond with the system of notation developed in Fig. 1. Terminal $C_3$ is thus conductively connected to the common terminals $C_1$, $C_2$, and $C_4$–$C_n$ of the remaining selector units.

More specifically in Fig. 2, pentode electron tubes V1 and V2 comprise a differential amplifier adapted to compare continuously the potentials appearing at terminals $I_3$ and $C_3$. The plates of tubes V1 and V2 are energized from a positive power source B+ through load resistors 11 and 12 respectively, and the cathodes of these tubes are connected in parallel and returned to a negative supply B— through the circuit of triode V3. The latter tube is biased by the negative drop across voltage divider resistor 13 as shunted by capacitor 14. By means of unbypassed cathode resistor 15 substantial negative feedback is introduced, with the result that triode V3 establishes a constant current at high impedance for the differential amplifier. Adjustment of resistor 15 establishes the desired amplifier current. The positive potential at the anode of tube V3 sets the bias for tubes V1 and V2.

The signal from input channel No. 3 is applied to the control grid of tube V1 from terminal $I_3$ through a conventional resistance capacitance coupling network 16. Common terminal $C_3$ is directly connected to the control grid of tube V2, and is returned to ground through grid resistor 17. The differential amplifier output is derived at the plate of tube V2, and is directly applied to the control grid of a pentode cathode follower tube V4. As the output of tube V1 is not used directly, its plate is shunted to ground by capacitor 18.

The output of cathode follower V4 is taken from cathode load resistor 21, and applied through a coupling circuit comprised of capacitor 22 and resistor 23 to the selector unit output terminal $O_3$ and there through rectifier element CR–1 to the common terminal of the system $C_3$. A second rectifier CR–2 is connected between terminal $O_3$ and ground and is so poled that terminal $O_3$ may not become negative. Rectifier CR–1 is arranged so that positive potentials appearing at terminal $O_3$ will be coupled to terminal $C_3$.

The positive operating potential for the parallel connected screen grids of the differential amplifier V1 and V2 is furnished by a conventional "boot-strap" cathode follower V5. Thus the screens of tubes V1 and V2 are connected to the cathode end of load resistor 24 while the control grid of cathode follower V5 is coupled by capacitor 25 to the differential amplifier common cathodes. Fluctuations in the potential level of the cathodes of V1 and V2 will be correspondingly transferred to the screens of these tubes through the cathode follower action of tube V5, whereby a constant screen-to-cathode potential is maintained. This arrangement assures constancy of mutual transconductance in differential amplifier tubes throughout the operating range. It will be observed that cathode follower V6 similarly "boot-straps" the screen grid of pentode V4 to its cathode, so as to maintain a constant potential difference between these electrodes and thus preclude substantial change in the characteristics of V4 in normal operation.

Prior to analyzing the mode of operation of the integrated system shown in Fig. 1, it would be well to consider the characteristics of the single selector unit shown in Fig. 2. Whatever is said of the characteristics of channel selector unit No. 3 is, of course, equally applicable to each of the remaining selectors.

Quiescently, differential amplifier electron tubes V1 and V2 divide equally the constant current established by triode V3 and its associated circuit. As noted above, the differential amplifier compares the amplitudes of signals applied to the control grids from terminals $I_3$ and $C_3$. A signal proportional to this difference appears at the plate of tube V2 and through the action of cathode follower V4 is transferred to the output terminal $O_3$. In the event that the potential at terminal $O_3$ is positive relative to the potential at the terminal $C_3$, the signal will pass through rectifier CR–1 and will be applied to terminal $C_3$. As an example, assume that terminal $C_3$ is at ground potential when a positive pulse appears at terminal $I_3$. This will instantaneously increase the current in pentode V1, but since the total differential amplifier current must remain constant, the current in tube V2 will decrease by an amount equal to the increase in tube V1. A positive pulse is thus obtained at the plate of tube V2 corresponding in time to the pulse applied to terminal $I_3$. Through cathode follower V4, the gain of which is unity as a practical matter, an equal positive pulse is capacitively coupled to terminal $O_3$ and further through rectfier CR–1 to terminal $C_3$ and to the control grid of tube V2. It will be apparent that this positive signal on the grid of tube V2 tends to increase the current flow through this tube and thereby lower the signal amplitude at its plate. It may be demonstrated that this feedback arrangement effectively functions to limit the pulse appearing at terminal $C_3$ to the amplitude of the initial pulse applied at terminal $I_3$. In short then, the application of a positive pulse to terminal $I_3$ results in the development of an equal amplitude pulse at both the output terminal $O_3$ and the common terminal $C_3$.

Consider now, the application of a pulse at terminal $I_3$ which is negative with respect to the instantaneous potential of terminal $C_3$. A negative pulse at terminal $I_3$ will reduce the current flow through tube V1 and increase the current through tube V2, thereby lowering the potential at the plate of the latter tube. This potential drop is coupled through cathode follower V4 and through capacitor 22 to output terminal $O_3$. However, as noted above, the polarity rectifier CR–2 is such as to short circuit negative signals at output terminal $O_3$. Hence, terminal $O_3$ will remain at ground potential and no signal will be transferred through rectifier CR–1 (since this, at most, can only pass positive going pulses) to the common terminal $C_3$. Summuarizing, if terminal $I_3$ is driven by a potential negative relative to that appearing at terminal $C_3$, no signal will appear at output terminal $O_3$.

At this point, the operation of the entire system illustrated in Fig. 1 may be fully explained. Let it be assumed that the potentials applied through the $n$ input channels to the corresponding $n$ channel selector units are as represented by the waveforms shown in Fig. 1. Here rectangular pulses are applied simultaneously to all channels with the maximum signal appearing in input channel No. 3. In any one of the plurality of channel selector units shown, the potential appearing at its output terminal will be determined by the relative difference in potential between its input and common terminals. However, by virtue of the differential amplifier feedback circuit noted in Fig. 2, all common terminals will substantially instantaneously arrive at a potential equal to the maximum applied to the system which, in this case, is the amplitude of the signal pulse applied to selector unit No. 3. Since the common terminals are at the maximum pulse potential, in all channel selectors other than No. 3, the respective input terminals will be at potentials lower than the common terminal. Therefore, no signal will appear at the output terminals of these channels. However, with respect to selector No. 3, a positive pulse will be developed at terminal $O_3$ which is substantially equal to the maximum pulse which was applied at input terminal $I_3$, for the reasons noted above in the analysis of Fig. 2. In other words, the utilization circuit in Fig. 1 will be energized by a pulse appearing at terminal $O_3$ and no other, when input signals as shown are applied to the $n$ input channels. The utilization circuit may then developed an output signal which is indicative in some way of channel No. 3. However, this function is not specifically a part of the present invention.

If immediately following the pulse waveforms illustrated in Fig. 1 a new series of pulses are applied with a maximum in input channel No. 4, then a pulse equal to this maximum will appear at terminal $O_4$, while no signals will appear at the remaining output terminals. In this manner, the overall system illustrated in Fig. 1 serves to provide indication of that one of the plurality of connected channels which instantaneously is carrying the signal of maximum amplitude.

Although the foregoing discussion was illustrated by reference to pulsed waveforms, there is nothing in the specific circuitry of Fig. 2 which serves to limit operation to pulsed information. In fact, the system disclosed herein is fully capable of operating under conditions of continuous voltage waves applied to all channels, or continuous waves applied to some channels while pulsed signals are applied to others, or, simply, upon the application of voltage signals to some but not necessarily all of the connected input channels. Whatever the nature of the applied signals, the final result will be the development at each instant in time of a potential at one of the $n$ output terminals equal to the maximum amplitude then being applied to the system.

It will be apparent that numerous refinements and additions of the foregoing disclosure may be made by those skilled in this electronic art. Accordingly, the scope of the present invention is to be regarded subject only to those limitations of the appended claims.

What is claimed is:

1. An electronic channel selector unit comprising a differential amplifier formed of first and second electron tubes having input and output circuits, means for establishing at substantially constant value the combined currents of said first and second tubes, means for applying a signal for selection to the input of said first electron tube, a third electron tube coupling the output of said second electron tube to an output terminal, a rectifier coupling said output terminal to said input of said second electron tube and being poled for the transfer to said input of signals of a predetermined polarity, and a second rectifier connected to said output terminal and poled to effectively short circuit thereat signals of opposite polarity.

2. Electrical apparatus comprising a plurality of parallel signal channels, a corresponding plurality of channel selector units each coupled to a respective one of said signal channels, each of said units including a differential amplifier formed of first and second electron tubes having input and output circuits, means for applying the signal transmitted in the coupled signal channel to said input of said first electron tube, a third electron tube coupling the output of said second electron tube to an output terminal of said unit, a rectifier coupling said output terminal to said input of said second electron tube and being poled for transfer to said last-mentioned input of signals of a predetermined polarity, a second rectifier connected to said output terminal and poled to effectively short circuit thereat signals of opposite polarity, means connecting in parallel the inputs to said second electron tube in each of said channel selector units, a utilization circuit, and means coupling each of said output terminals of said units to said utilization circuit, whereby said utilization circuit is energized from said channel selector unit coupled to the input signal channel transmitting the maximum signal.

3. An electronic channel selector unit comprising, a differential amplifier formed of first and second differentially coupled electron tubes having input and output circuits, means for applying a signal for selection to the input of said first electron tube, a third electron tube coupling the output of said second electron tube to an output terminal, means coupling said output terminal to said input of said second electron tube, and a rectifier connected to said output terminal for effectively short-circuiting thereat signals of a predetermined polarity.

4. An electronic channel selector unit comprising, a differential amplifier formed of first and second differentially coupled electron tubes having input and output circuits, means for applying a signal for selection to the input of said first electron tube, a third electron tube coupling the output of said second electron tube to an output terminal, a rectifier coupling said output terminal to said input of said second electron tube and being poled for the transfer to said input of signals of a predetermined polarity, and a second rectifier connected to said output terminal and poled to effectively short-circuit thereat signals of opposite polarity.

5. Electrical apparatus comprising, a plurality of channel selector units each coupled to a respective one of said signal channels, each of said units including a differential amplifier formed of first and second electron tubes each having cathode, grid and plate circuits, means for applying the signal transmitted in the signal channel coupled thereto to the grid circuit of said first electron tube, a cathode follower coupling the plate circuit of said second electron tube to an output terminal of said unit, a rectifier coupling said output terminal to said grid circuit of said second electron tube and being poled for the transfer to said last-mentioned grid circuit of signals of a predetermined polarity, a second rectifier connected to said output terminal and poled to effectively short-circuit thereat signals of opposite polarity, means connecting in parallel the grid circuits of said second electron tube in each of said channel selector units, a utilization circuit, and means coupling said output terminal of each of said units to said utilization circuit whereby said utilization circuit is energized from said channel selector unit coupled to the input signal channel transmitting the maximum amplitude signal.

6. Apparatus for selecting one of a plurality of signal channels on the basis of maximum signal amplitude comprising, a corresponding plurality of channel selector circuit units each coupled to a respective one of said signal channels, means for continuously deriving a common signal from the channel selector associated with the channel carrying the maximum signal for application to all of said channel selector units, means in each of said selector units for instantaneously and continuously comparing the signal received from the respective signal channel and said common signal for providing a signal of one polarity when said signals under comparison are substantially equal and of opposite polarity when unequal, and means in each of said channel selector units for transmitting as a system output signals of said first polarity while precluding tranmission of signals of said opposite polarity, said last-mentioned means including a rectifier in each channel selector unit poled to effectively short-circuit signals of said opposite polarity.

References Cited in the file of this patent

UNITED STATES PATENTS

| | | |
|---|---|---|
| 2,485,665 | Shepherd | Oct. 25, 1949 |
| 2,488,193 | Hughes | Nov. 15, 1949 |
| 2,492,780 | Atwood | Dec. 27, 1949 |
| 2,507,160 | Hugenholtz, et al. | May 9, 1950 |
| 2,551,805 | McDonald | May 8, 1951 |
| 2,572,912 | Bucher | Oct. 30, 1951 |
| 2,628,309 | Hughes | Feb. 10, 1953 |